(12) United States Patent
Kwon (10) Patent No.: US 7,616,975 B2
(45) Date of Patent: Nov. 10, 2009

(54) FOLDER TYPE MOBILE PHONE

(75) Inventor: Soon-Sung Kwon, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 447 days.

(21) Appl. No.: 11/374,483

(22) Filed: Mar. 9, 2006

(65) Prior Publication Data

US 2006/0200943 A1    Sep. 14, 2006

(30) Foreign Application Priority Data

Mar. 9, 2005    (KR) .................. 10-2005-0019814

(51) Int. Cl.
*G06F 15/00* (2006.01)
(52) U.S. Cl. .................. 455/575.3; 455/90.1
(58) Field of Classification Search ............. 455/556.1, 455/344, 550.1, 566, 575.3, 90.1; 379/433.13, 379/434, 428; 16/33, 221, 330, 325, 342
See application file for complete search history.

(56) References Cited

U.S. PATENT DOCUMENTS 6,879,337 B2 * 4/2005 Tatehana et al. ......... 348/14.02

| | | |
|---|---|---|
| 2002/0128053 A1 | 9/2002 | Jung |
| 2003/0109232 A1* | 6/2003 | Park et al. ..................... 455/90 |
| 2005/0075151 A1 | 4/2005 | Hou |
| 2005/0090297 A1* | 4/2005 | Yang et al. ............... 455/575.3 |

FOREIGN PATENT DOCUMENTS

| | | |
|---|---|---|
| CN | 1157917 | 8/1997 |
| EP | 1263191 | 12/2002 |
| JP | 2002-305569 | 10/2002 |

* cited by examiner

*Primary Examiner*—Sam Bhattacharya
(74) *Attorney, Agent, or Firm*—Lee, Hong, Degerman, Kang & Waimey (57) ABSTRACT

The present invention relates to a folder type mobile phone. An object of the present invention is to provide a folder type mobile phone with an increased life span thereof by preventing two housings from being shaken with respect to each other in a closed position where the two housings are folded on each other. To this end, the folder type mobile phone of the present invention comprises first and second housings which are folded and closed on each other and pivotably connected to each other through a hinge; and a contact means which is installed to any one of the first and second housings near the hinge and brought into close contact with the other housing in a closed position to prevent the first and second housings from being shaken with respect to each other.

14 Claims, 12 Drawing Sheets

FOLDER TYPE MOBILE PHONE

CROSS REFERENCE TO RELATED APPLICATION

Pursuant to 35 U.S.C. § 119(a), this application claims the benefit of earlier filing date and right of priority to Korean Application No. 10-2005-0019814, filed Mar. 9, 2005, the contents of which are hereby incorporated by reference herein in their entirety.

BACKGROUND OF THE INVENTION

1. Field of Invention

The present invention relates to a folder type mobile phone including a folder housing and a main body housing, and more particularly, to a folder type mobile phone for preventing a main body housing and a folder housing from being shaken with respect to each other.

2. Description of the Prior Art

As well known in the art, a folder type mobile phone is configured in such a manner that a main body housing and a folder housing are connected to each other through a hinge and the folder housing rotates with respect to the main body housing. According to the rotation of the folder housing, the folder type mobile phone has a closed position where the folder housing is folded on the main body housing and an open position where the folder housing is rotated by a predetermined angle with respect to the main body housing.

Figure 1:
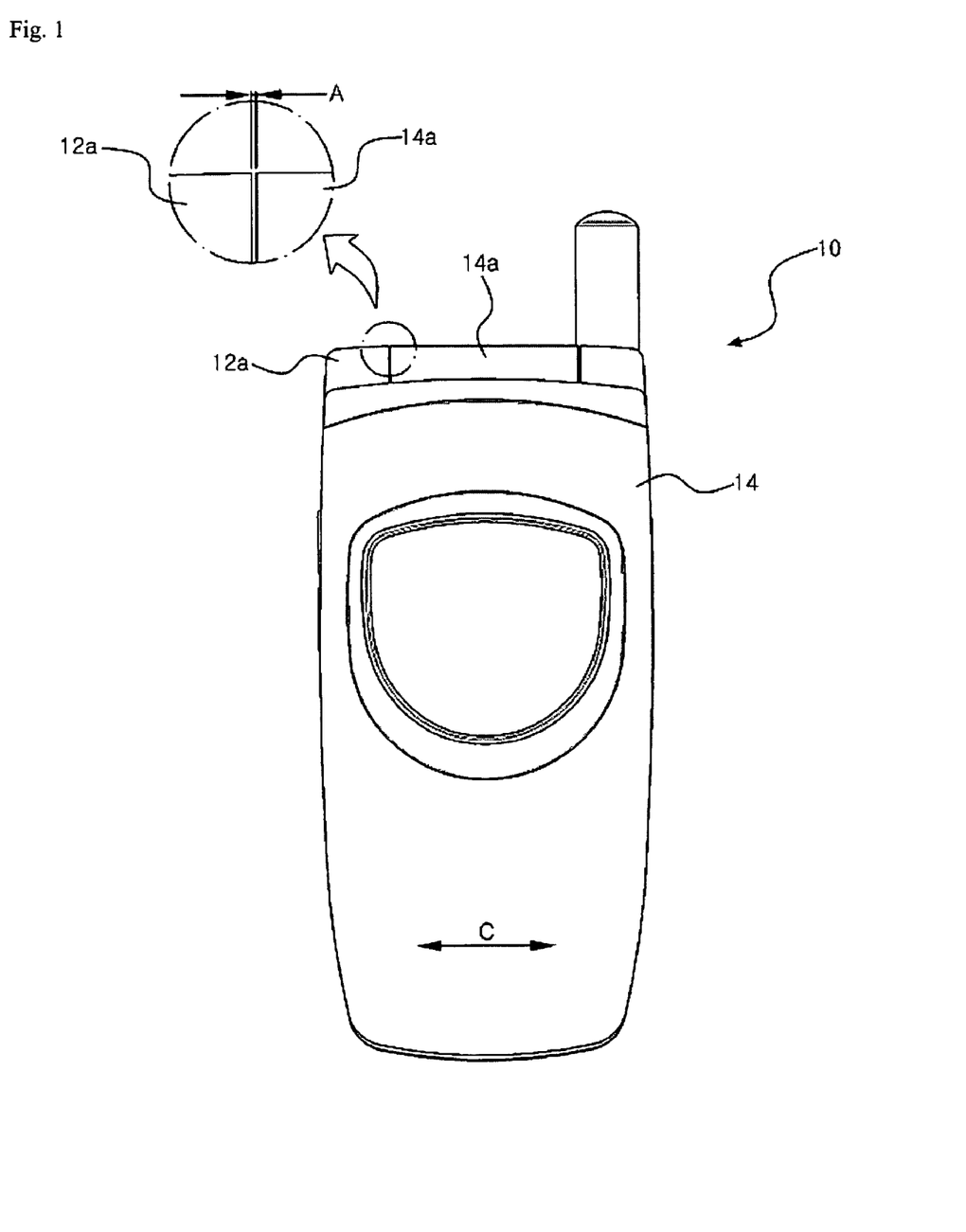
FIG. 1 is a front view showing a folder type mobile phone according to a prior art.
Figure 2:
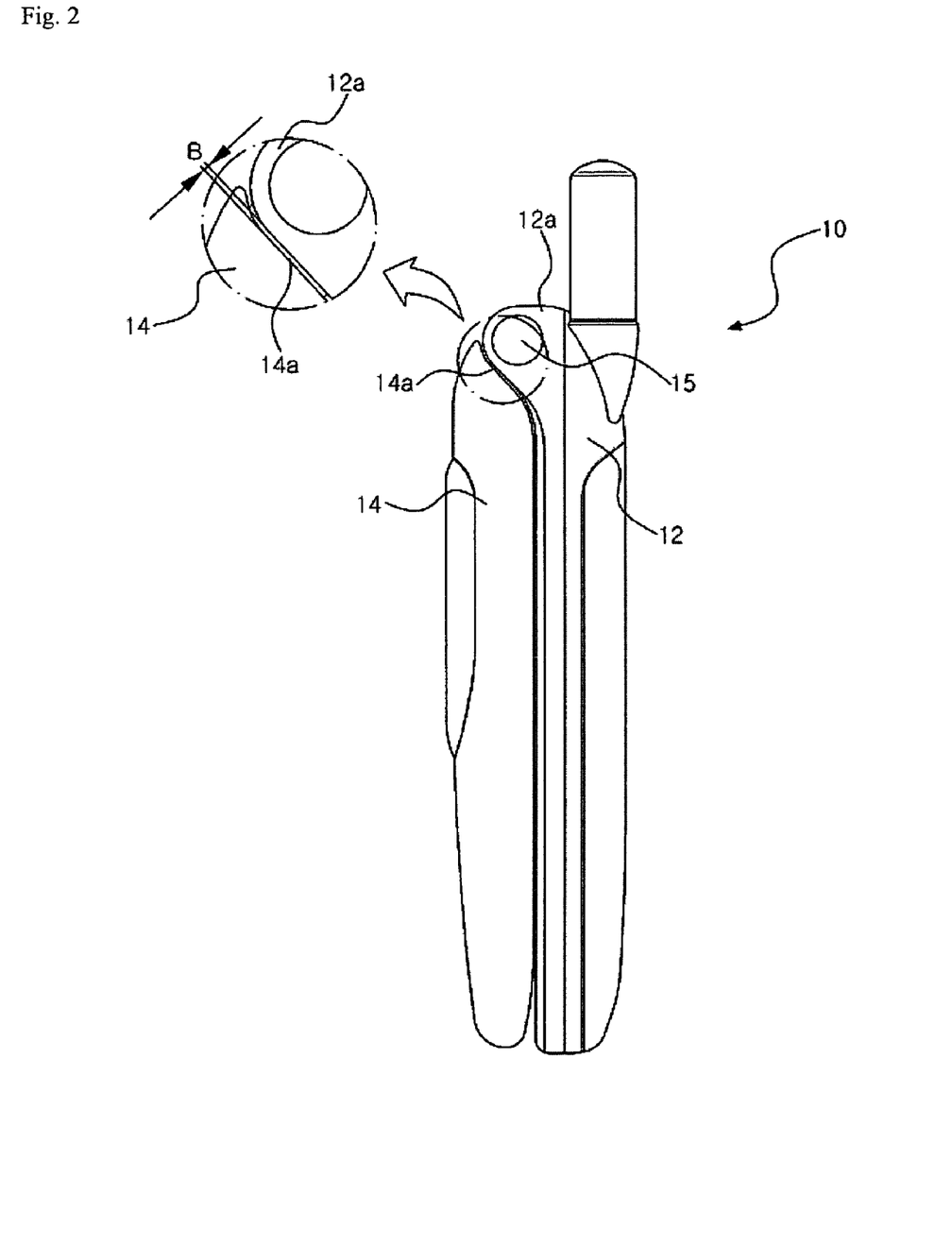
FIG. 2 is a side view showing the folder type mobile phone according to the prior art.

FIGS. 1 and 2 are front and side views showing a conventional folder type mobile phone which is in the closed position.

As shown in FIGS. 1 and 2, the conventional folder type mobile phone 10 includes a main body housing 12 and a folder housing 14. The main body housing 12 and the folder housing 14 include hinge arms 12a and a hinge shoulder 14a, respectively, and are pivotably connected to each other through a hinge pin 15 passing through the hinge arms and shoulder.

At this time, predetermined gaps A and B are inevitably formed between the hinge arms 12a and the hinge shoulder 14a shown in FIG. 1 and between adjacent ends of the main body housing 12 and the folder housing 14 shown in FIG. 2, respectively, to allow the folder housing 14 to smoothly rotate with respect to the main body housing 12.

The gaps A and B cause the undesirable shaking of the folder housing 14 with respect to the main body housing 12 in a transverse direction, i.e. in a direction of an arrow C shown in FIG. 1. Since such a shaking motion frequently occurs in the closed position where the mobile phone is not used, it becomes one of factors for shortening the life span of the mobile phone, particularly the life span of a portion adjacent to the hinge.

Although there were researches for increasing the life span of the folder type mobile phone, such researches are limited to reducing the shock generated when the folder housing is opened or closed. There was no research for preventing the housings from being shaken in a stationary position where the folder housing is not moving.

SUMMARY OF THE INVENTION

Accordingly, an object of the present invention is to provide a folder type mobile phone with an increased life span thereof by preventing the two housings from being shaken with respect to each other in a closed position where the two housings are folded on each other.

Another object of the present invention is to provide a folder type mobile phone including a means for preventing the two housings from being shaken with respect to each other near a hinge through which the two housings are pivotably connected to each other.

A further object of the present invention is to provide a folder type mobile phone including a means for preventing the two housings from being shaken with respect to each other near side surfaces of the housings.

According to an aspect of the present invention for achieving the objects, there is provided a folder type mobile phone, comprising first and second housings folded and closed on each other and pivotably connected to each other through a hinge; and a contact means installed to any one of the first and second housings near the hinge and brought into close contact with the other housing in a closed position to prevent the first and second housings from being shaken with respect to each other.

In the folder type mobile phone according to a preferred embodiment of the present invention, the first and second housings are preferably provided with a hinge arm and a hinge shoulder at opposite ends thereof, respectively, such that the housings can be hingedly coupled with each other. In such a case, the contact means may be installed to an end surface of the second housing positioned on the periphery of the hinge shoulder and brought into close contact with an outer peripheral surface of the hinge arm in the closed position. Alternatively, the contact means may be installed to an outer peripheral surface of the hinge arm and brought into close contact with an end surface of the second housing positioned on the periphery of the hinge shoulder. Further, in a case where the contact means is installed to the end surface of the second housing positioned on the periphery of the hinge shoulder and brought into close contact with the outer peripheral surface of the hinge arm, the contact means can prevent the two housings from being shaken with respect to each other even in a position where the second housing is fully opened from the first housing as well as in the closed position.

According to another embodiment of the present invention, the contact means is preferably installed to an inner side surface of a hinge arm extension portion extending from the hinge arm and brought into close contact with an outer side surface of a neck portion of the hinge shoulder. Alternatively, the contact means may be installed to an outer side surface of a neck portion of the hinge shoulder and brought into close contact with an inner side surface of a hinge arm extension portion extending from the hinge arm.

According to another aspect of the present invention, there is provided a folder type mobile phone, comprising first and second housings folded and closed on each other and pivotably connected to each other through a hinge; a rib formed near an outer edge of any one of the first and second housings and facing an outer side surface of the other housing in a closed position; and a contact means installed on the rib to come into close contact with the outer side surface in the closed position, thereby preventing the second housing from being shaken with respect to the first housing.

In the folder type mobile phone according to the present invention, the contact means may include a contact protrusion made of a viscoelastic material or a contact protrusion elastically and retractably installed to the housing. Further, the contact protrusion is preferably flush with the corresponding contact surface in the closed position.

BRIEF DESCRIPTION OF THE DRAWINGS

The above and other objects, features and advantages of the present invention will become apparent from the following descriptions of preferred embodiments given in conjunction with the accompanying drawings, in which.

DETAILED DESCRIPTION OF THE PREFERRED EMBODIMENT

Hereinafter, preferred embodiments of the present invention will be described in detail with reference to the accompanying drawings.

Figure 3:
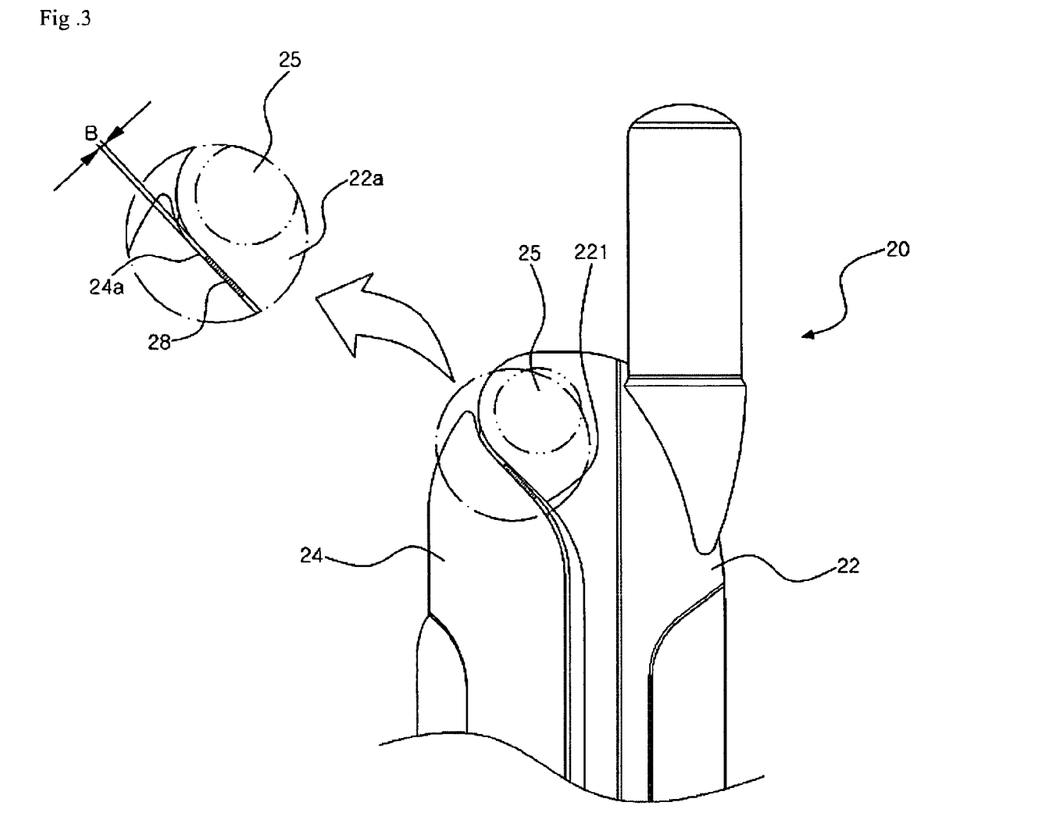
FIG. 3 is a side view showing a folder type mobile phone, which is in a closed position, according to a first embodiment of the present invention.
Figure 4:
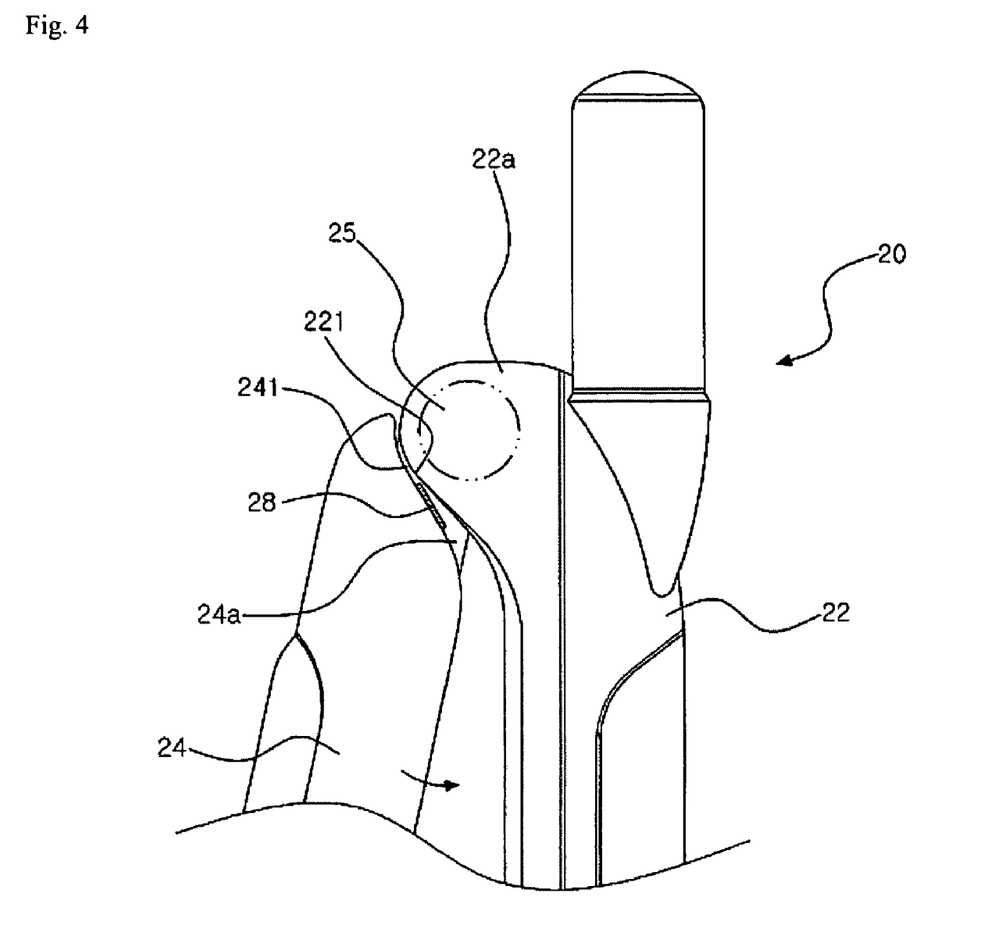
FIG. 4 is a side view showing the folder type mobile phone shown in FIG. 3, which is in an open position at a predetermined angle.
Figure 5:
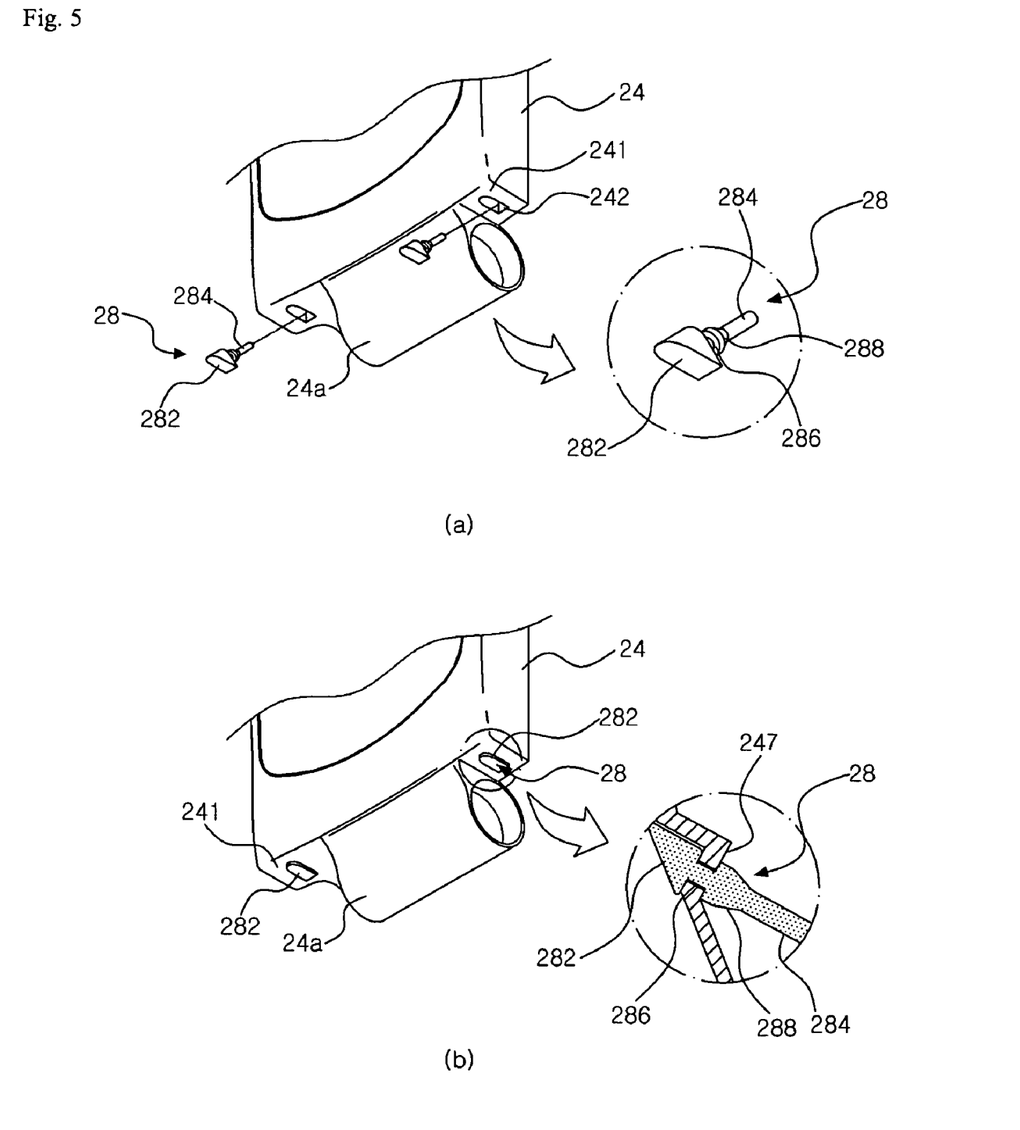
FIG. 5 is a view showing an example in which contact protrusions are installed to the folder type mobile phone shown in FIGS. 3 and 4.

FIGS. 3 to 5 are views illustrating a folder type mobile phone according to a first embodiment of the present invention.

As shown in FIG. 3, a folder type mobile phone 20 of the present embodiment includes a first housing 22 and a second housing 24 that are pivotably connected to each other by a hinge. In this embodiment, the first housing 22 is provided with a printed circuit board and the like therein and a key input portion on a front surface thereof, while the second housing 24 is provided with a display portion thereon. However, the present invention is not limited thereto. Further, in the present specification and claims, the terms "folder type mobile phone" means all kinds of mobile phones configured such that the two housings can be hingedly coupled to each other.

For the aforementioned hinged coupling, hinge arms 22a and a hinge shoulder 24a are provided near the adjacent ends of the first and second housings 22 and 24 facing each other, respectively. In addition, the first housing 22 and the second housing 24 are pivotably connected to each other through a hinge pin 25 represented by an imaginary line, which sequentially passes through hollow portions of the hinge arms 22a and the hinge shoulder 24a. At this time, the hinge pin 25 may be configured to impart a predetermined rotational force to the housings in a predetermined range, for example, using a cam operation and/or using resilient compressive and restoring forces of a spring.

As seen from an enlarged view of FIG. 3, there is a gap B between the first and second housings 22 and 24 adjacent to each other, which causes the undesirable shaking between the housings. According to this embodiment of the present invention, contact protrusions 28 made of a viscoelastic material, more preferably a rubber material, are positioned in the gap B to prevent the undesirable shaking between the two housings.

A state where the second housing 24 is rotated by a predetermined angle from a closed position of FIG. 3 is shown in FIG. 4. Referring to FIG. 4, the contact protrusions 28 are fixedly installed to end surfaces 241 of the second housing 24 positioned on the periphery of the hinge shoulder 24a (see FIG. 5). The installation positions of the contact protrusions 28 cause the second housing 24 not to be hindered by the contact protrusions 28 while the second housing 24 rotates with respect to the first housing 22. In addition, the contact protrusions 28 are positioned in the gap B between the first housing 22 and the second housing 24 to prevent the housings 22 and 24 from being shaken with respect to each other, and particularly in a transverse direction, even not only in the closed position shown in FIG. 3 but also in a fully opened position where the second housing 24 rotates with respect to the first housing 22 and is then further moved to enable a user to use the folder type mobile phone.

Further, the contact protrusions 28 serve to prevent the housings 22 and 24 from being shaken with respect to each other in the closed position and the fully open position. Furthermore, the contact protrusions 28 function as a damper for absorbing shocks caused from the collision between the housings 22 and 24 when the second housing 24 rotates either from the open position to the closed position or from the closed position to the fully open position and collides against the first housing 22.

FIGS. 5 (*a*) and (*b*) show a state where the contact protrusions 28 are fixedly installed to the end surfaces 241 of the second housing 24. Referring to FIG. 5, each of the contact protrusions 28 has a contact surface 282 which is brought into close contact with an outer peripheral surface 221 of a hinge arm 22a of the first housing 22 to be flush with the outer peripheral surface (see FIGS. 3 and 4). The contact surface 282 is brought into contact with the outer peripheral surface 221 which is inclined below the hinge arm 22a, thereby increasing the contact area of the contact protrusion 28 with respect to the hinge arm 22a.

Before being installed to the folder type mobile phone, the contact protrusion 28 has a linear pulling portion 284 positioned at a tip end thereof. By pulling the pulling portion 284 through an assembly hole 242 formed in the second housing 24, the contact protrusion 28 can be easily inserted into the assembly hole 242.

Next, as seen from FIG. 5 (*b*), a catching groove 286 provided in the contact protrusion 28 is caught to an inner wall 247 of the second housing 24, so that the contact protrusion 28 can be securely fixed in the assembly hole 242. In addition, the contact protrusion 28 includes a tapered portion 288 formed adjacent to the catching groove 286. The tapered portion 288 elastically contracts until the catching groove 286 of the contact protrusion 28 is caught to the inner wall 247 of the second housing 24, so that the contact protrusion 28 can be smoothly assembled into the second housing 24. After assembling, the pulling portion 284 of the contact protrusion 28 is cut off and the installation of the contact protrusion 28 will be thus completed.

Although it has been described in this embodiment that the contact protrusions 28 are installed to the second housing 24 in an assembled manner, the present invention is not limited thereto. According to the present invention, the contact protrusions may be installed using a bonding, melting or other method.

Figure 6:
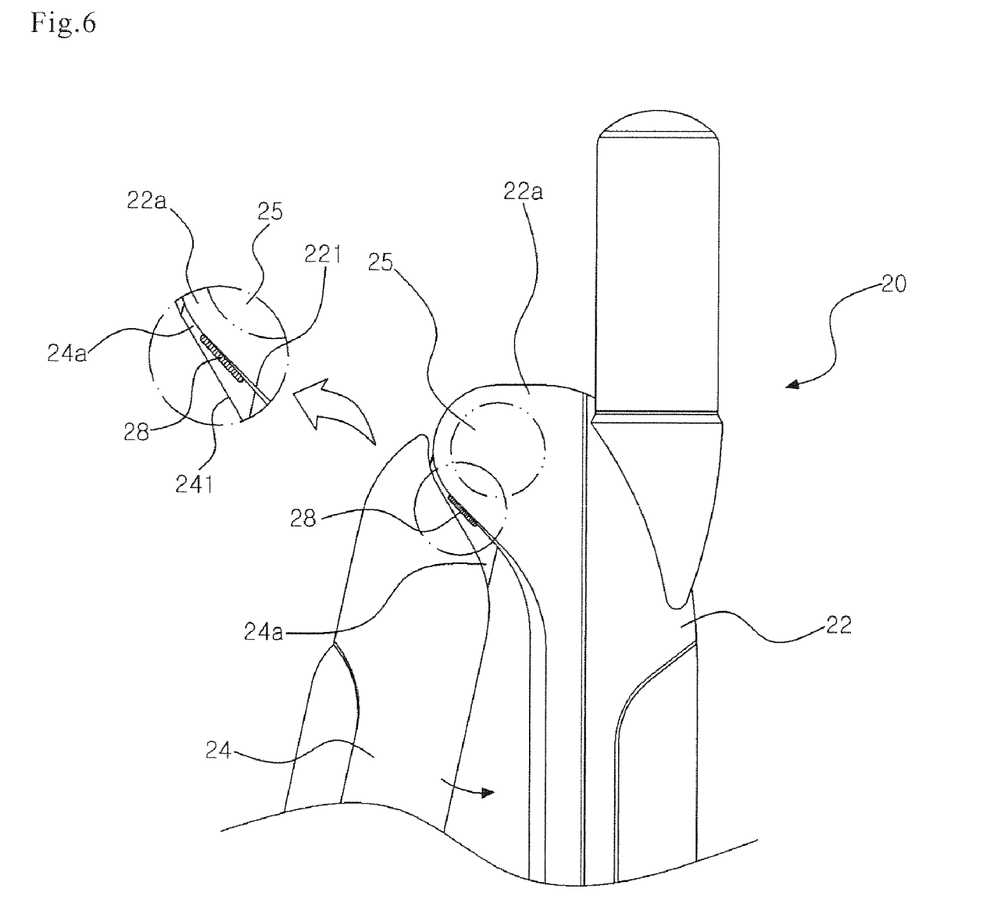
FIG. 6 is a side view showing a folder type mobile phone, which is in an open position at a predetermined angle, according to a second embodiment of the present invention.

FIG. 6 is a side view partially showing a folder type mobile phone according to a second embodiment of the present invention. In the folder type mobile phone shown in FIG. 6, contact protrusions 28 are fixedly installed to outer peripheral surfaces 221 of hinge arms formed on a first housing 22. Further, the contact protrusions 28 are brought into close contact with end surfaces 241 of a second housing 24 positioned on the periphery of both sides of a hinge shoulder 24a in a closed position of the folder type mobile phone. Thus, the contact protrusions 28 according to the second embodiment can also prevent the first and second housings 22 and 24 from being shaken with respect to each other between the facing ends of the housings 22 and 24 when the folder type mobile phone is in the closed position. Similar to the previous first embodiment of the present invention, the rotation of the second housing 24 is not hindered by the contact protrusions 28.

Figure 7:
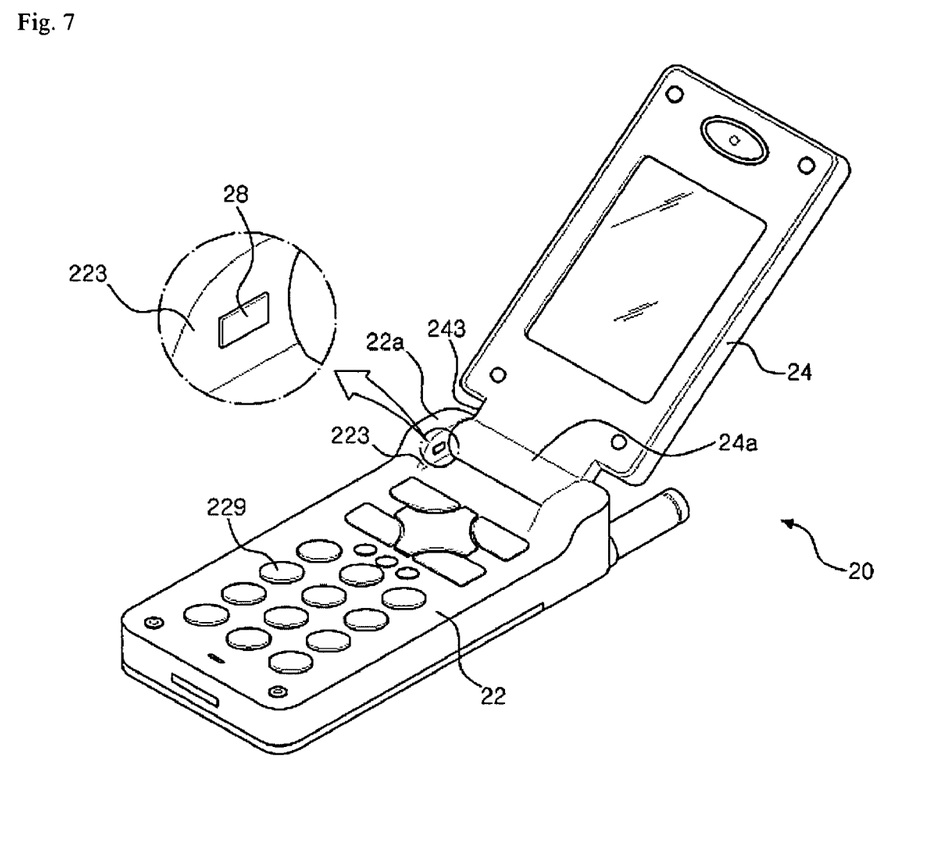
FIG. 7 is a perspective view showing a folder type mobile phone according to a third embodiment of the present invention.
Figure 8:
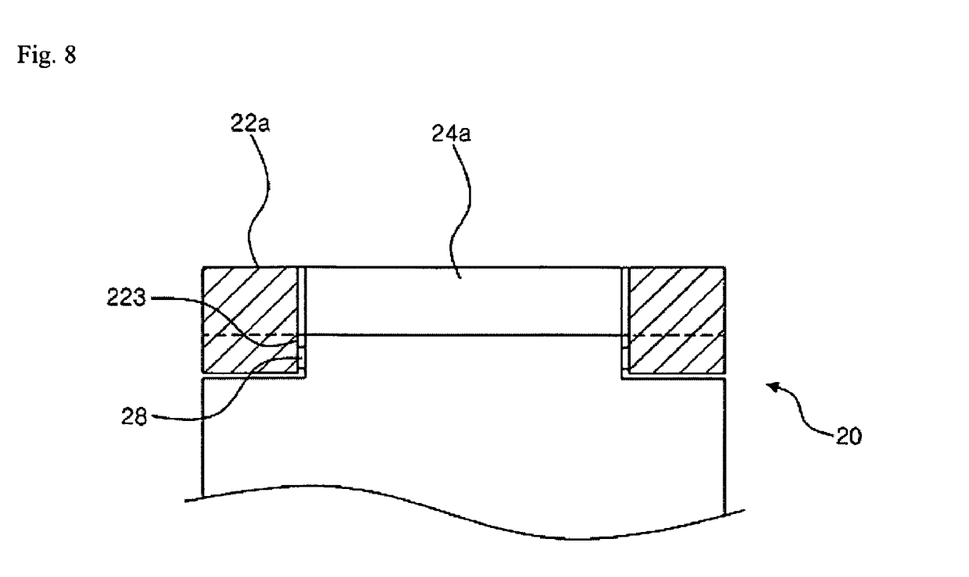
FIG. 8 is a schematic sectional view for illustrating major portions of the folder type mobile phone shown in FIG. 7.

FIGS. 7 and 8 are views illustrating a folder type mobile phone according to a third embodiment of the present invention.

Referring to FIGS. 7 and 8, a folder type mobile phone 20 according to the third embodiment includes hinge arm extension portions 223 which are formed to extend downwardly from the hinge arms 22a. The hinge arm extension portions 223 extend downwardly from the hinge arms 22a not to be covered with side surfaces of the hinge shoulder 24a and vertically intersect the front surface of a first housing 22 on which a key pad 229 is provided. The contact protrusions 28 are fixedly installed to the inner side surfaces of the hinge arm extension portions 223 and thus brought into close contact with the outer surfaces of a neck portion 243 extending upwardly from the hinge shoulder 24a of a second housing 24 in a closed position of the folder type mobile phone 20.

Thus, the contact protrusions 28 prevent the shake between both the housings in the closed position where the second housing 24 is folded on the first housing 22. At this time, the contact protrusion 28 may be made of a viscoelastic material with low surface friction resistance or have a contact surface coated with a low surface friction resistance material. This suppresses or reduces the hindrance of closing action due to the surface friction resistance of the contact protrusions 28 when the second housing 24 is folded and closed on the first housing 22. Further, the hindrance of closing action by the surface friction resistance can be removed due to a variety of surface shape designs of the contact protrusions 28 or housings brought into contact with the protrusions.

Figure 9:
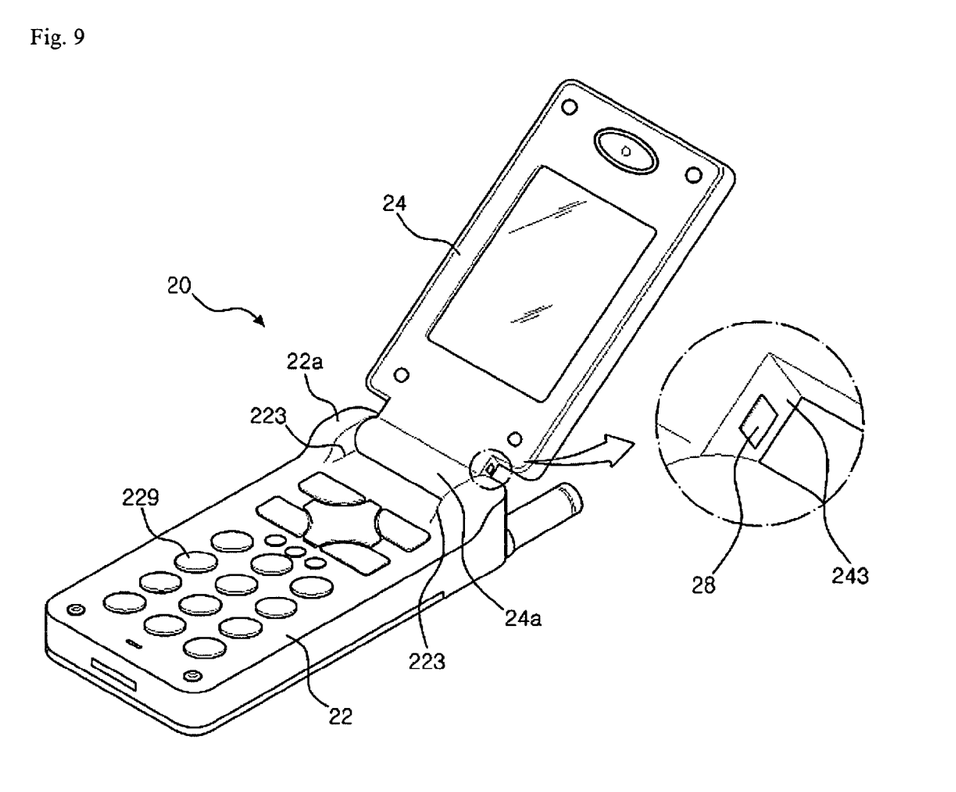
FIG. 9 is a perspective view showing a folder type mobile phone according to a fourth embodiment of the present invention.

FIG. 9 is a perspective view showing a folder type mobile phone according to a fourth embodiment of the present invention. Referring to FIG. 9, contact protrusions 28 are provided at positions opposite to those of the previous third embodiment. That is, the contact protrusions 28 are fixedly installed to outer surfaces of a neck portion 243 extending upwardly from a hinge shoulder 24a of a second housing 24 and thus brought into close contact with inner surfaces of hinge arm extension portions 223 formed in hinge arms 22a of a first housing 22. Thus, the contact protrusions 28 of this embodiment can prevent the two housings 22 and 24 from being shaken with respect to each other in the closed position.

In the foregoing, the embodiments of the folder type mobile phone comprising the means for preventing the housings 22 and 24 from being shaken with respect to each other near the hinge where the housings are connected with each other have been described. Hereinafter, a folder type mobile phone comprising a means for preventing the housings from being shaken with respect to each other near the sides of the housings rather than near the hinge will be described.

Figure 10:
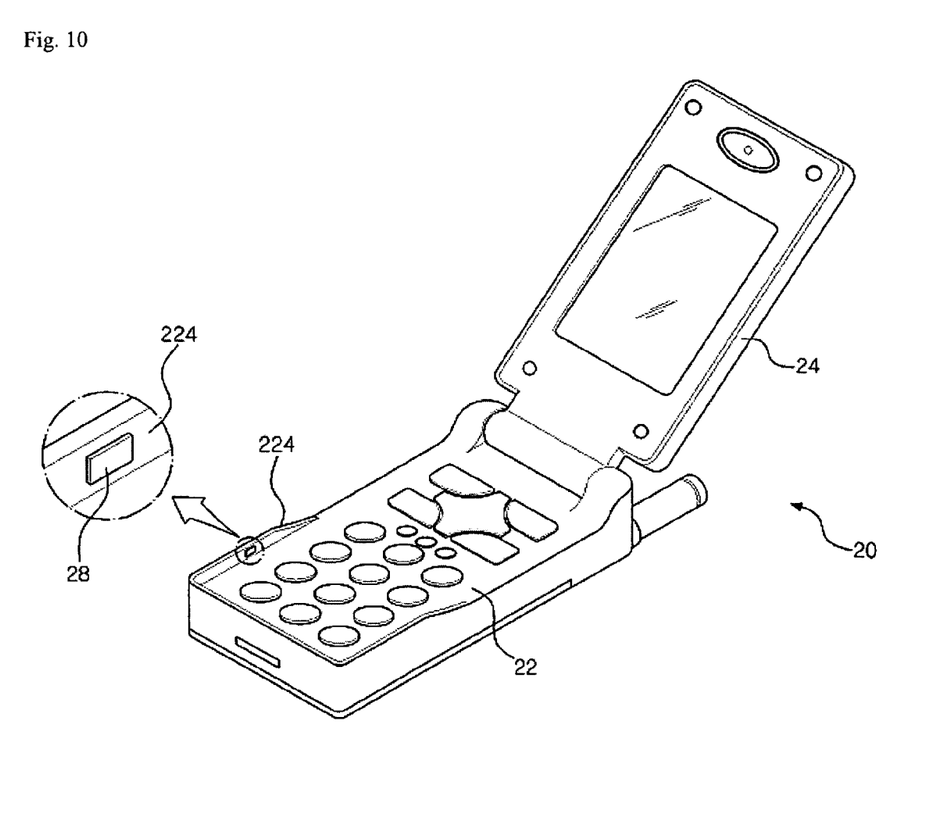
FIG. 10 is a perspective view showing a folder type mobile phone according to a fifth embodiment of the present invention.

FIG. 10 shows a folder type mobile phone according to a fifth embodiment of the present invention. Referring to FIG. 10, the folder type mobile phone of this embodiment is configured in such a manner that first and second housings 22 and 24 are pivotably connected to each other through a hinge in the same manner as the previous embodiments. The first housing 22 includes a rib 224 which protrudes forward from positions near an outer edge of the housing, particularly near side surfaces of the housing. Although it has been described in this embodiment that the rib 224 is formed near both the side surfaces and an end surface of the first housing 22, the present invention is not limited thereto. The rib 224 may be formed only near the side surfaces of the first housing 22 or the end surface of the first housing 22. The rib 224 faces an outer surface of the second housing 24 at a certain gap from each other in a closed position where the second housing 24 is folded and closed on the first housing 22.

In the meantime, contact protrusions 28 are fixedly installed in the inner surfaces of the rib 224. The contact protrusions 28 are positioned between the first and second housings 22 and 24 in the closed position. Further, while being fixedly installed in the inner surface of the rib 224 of the first housing 22, the contact protrusions 28 are brought into close contact with the side surfaces of the second housing 24 and thus prevent the first and second housing 22 and 24 from being shaken with respect to each other. It is preferred that the contact protrusions 28 of this embodiment be made of a material with low surface friction resistance or have a contact surface coated with a material with low surface friction resistance in the same manner as the previous third and fourth embodiments.

Figure 11:
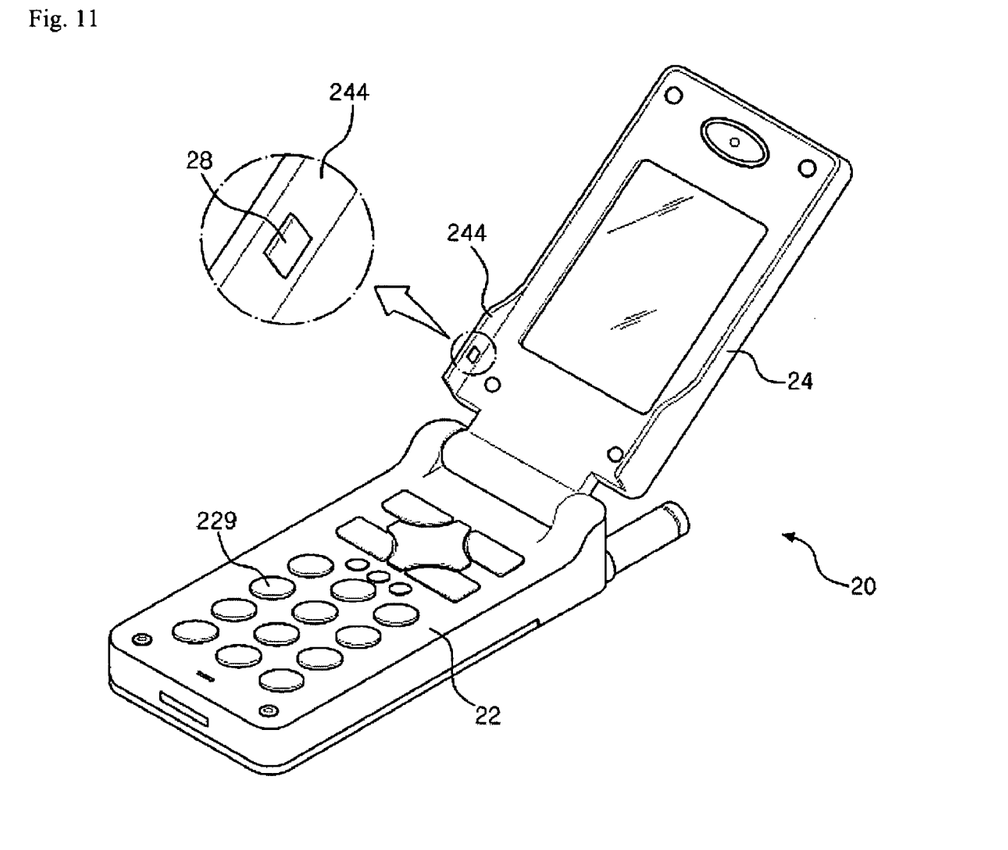
FIG. 11 is a perspective view showing a folder type mobile phone according to a sixth embodiment of the present invention.

FIG. 11 is a perspective view showing a folder type mobile phone according to a sixth embodiment of the present invention. Referring to FIG. 11, contact protrusions 28 are provided at positions opposite to those of the previous fifth embodiment. That is, in this embodiment, ribs 244 formed with the contact protrusions 28 protrude forward from side surfaces of a second housing 24. The rib 244 and the contact protrusions 28 fixedly installed thereto face outer side surfaces of a first housing 22 in a closed position of the folder type mobile phone. Particularly, the contact protrusions 28 are brought into close contact with the opposite outer side surfaces of the first housing 22, thereby preventing the first and second housings 22 and 24 from being shaken with respect to each other.

It has been generally described in the embodiments illustrated in FIGS. 3 to 11 that the contact protrusions made of a viscoelastic material function as the means for preventing the housings from being shaken with respect to each other.

Figure 12:
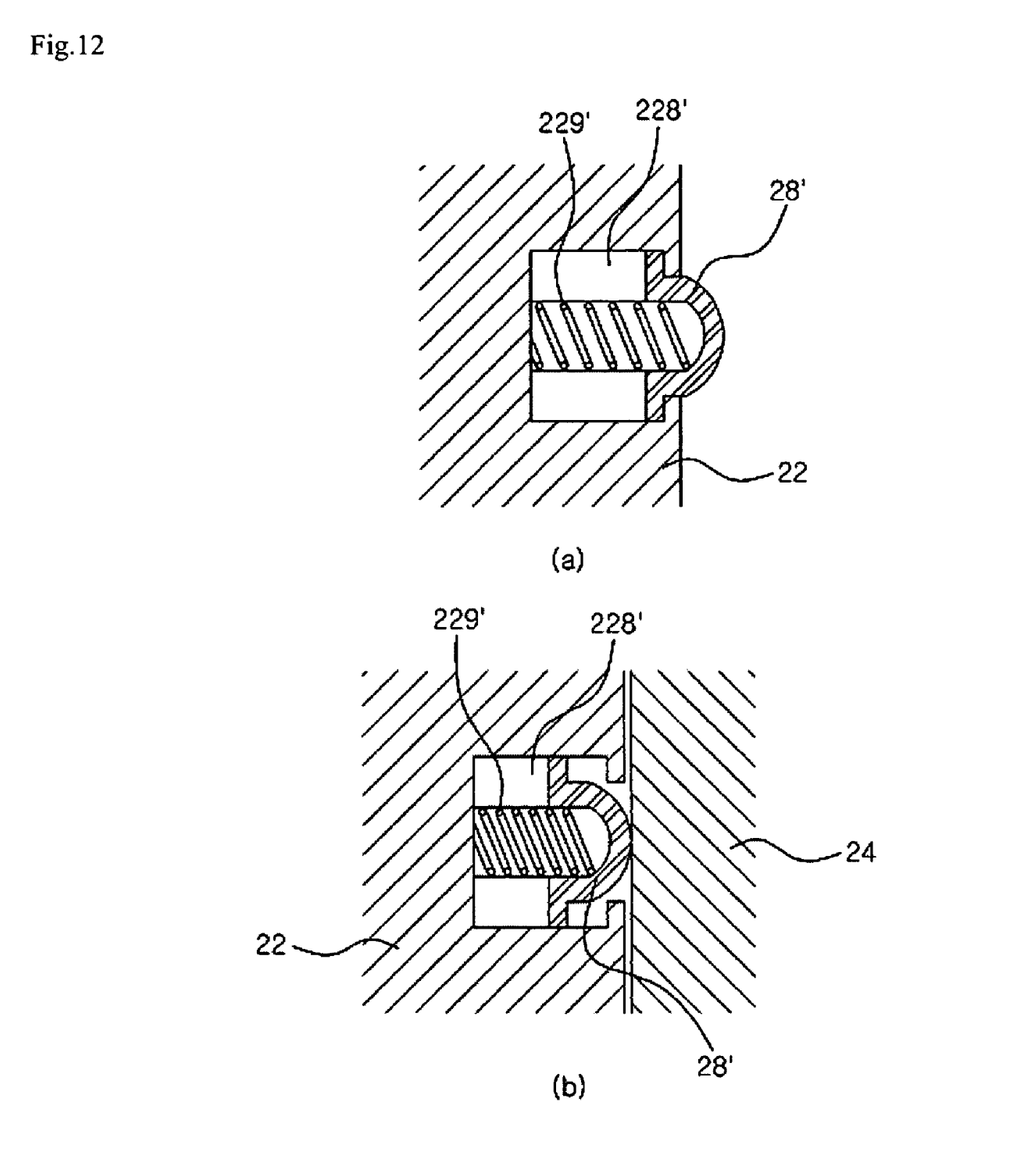
FIG. 12 is sectional views showing a contact protrusion used in a folder type mobile phone according to a seventh embodiment of the present invention.

However, so long as the contact protrusions of the present invention can prevent the housings from being shaken with respect to each other at least in the closed position of the folder type mobile phone, they may be made of other materials and have other structures than those of the aforementioned embodiments. FIG. 12 is a schematic sectional view illustrating a folder type mobile phone having a contact protrusion according to a seventh embodiment of the present invention.

Referring to FIG. 12, a contact protrusion 28' formed of resin through injection molding may be retractably installed at a position on a first housing 22. To this end, the first housing 22 is formed with a groove 228' for accommodating and maintaining a portion of the contact protrusion 28'. Further, a spring 229' is interposed between the floor surface of the groove 228' and the bottom surface of the contact protrusion 28'. Therefore, when a certain pushing force is applied to the contact protrusion 28', the contact protrusion 28' retracts into the first housing 22. If the applied force is removed, the contact protrusion 28' moves forward to its original position.

In addition, it is preferred that the outer surface of the contact protrusion 28' be shaped into a curved surface or a smoothly inclined curved surface. The reason is that when a second housing 24 rotates to be closed perpendicular to the contact protrusion 28' installed to the first housing 22, the contact protrusion 28' can be smoothly pushed and retracted by the rotating second housing 24.

In the meantime, the elastic force of the spring 229' for biasing the contact protrusion 28' toward the second housing 24 causes the contact protrusion 28' to be smoothly pushed and retracted by the second housing 24. Preferably, the elastic force is determined to have a value enough to prevent the first and second housings 22 and 24 from being shaken with respect to each other.

Heretofore, it has been described that the contact protrusion 28' is installed in the first housing 22 and brought into close contact with the second housing 24. However, the contact protrusion 28' may be installed to the second housing 24 and brought into close contact with the first housing 22, which can be sufficiently understood from the first to sixth embodiments of the present invention by those skilled in the art.

As described above, the present invention prevents the folder housing from being shaken on the main body housing at the stationary position of the folder type mobile phone, thereby reducing the damage or breakage of the mobile phone due to the shaking of the housings and thus increasing the life span of the mobile phone. Further, the present invention prevents the folder housing from being shaking with respect to the main body housing, thereby improving the feeling when a user grips the mobile phone by hand.

Furthermore, the present invention has advantages of reducing the failure and life shortening of the mobile phone due to the frequent collision between the folder housing and the main body housing, as well as the advantage of preventing the housings from being shaken with respect to each other.

Although the present invention have been described with specified embodiments as mentioned above, it will be apparent to those skilled in the art that various modifications, changes and corrections can be made thereto within the objects of the present invention and the appended claims. Therefore, the aforementioned descriptions and the accompanying drawings should be construed as not limiting the technical spirit of the present invention but illustrating the present invention.

What is claimed is:

1. A folder type mobile phone, comprising:
   a first housing;
   a second housing, wherein the second housing may be folded and closed on the first housing and is pivotably connected to the first housing via a hinge; and
   a contact means installed on one of the first and second housings in close proximity to the hinge, wherein the contact means contacts a housing unit opposite to that which it was installed when the first and second housing are closed to prevent the first and second housings from moving in a direction with respect to each other.

2. The mobile phone of claim 1, wherein the first and second housings include a hinge arm and a hinge shoulder at opposite ends thereof, respectively, such that the housings may be hingedly coupled with each other.

3. The mobile phone of claim 2, wherein the contact means is installed to an end surface of the second housing positioned on the periphery of the hinge shoulder and brought into contact with an outer peripheral surface of the hinge arm in a closed position of the mobile terminal.

4. The mobile phone as claimed in claim 3, wherein the contact means is brought into contact with the outer peripheral surface of the hinge arm when the second housing is fully opened from the first housing.

5. The mobile phone as claimed in claim 1, wherein the contact means is installed to an outer peripheral surface of the hinge arm and brought into contact with an end surface of the second housing positioned on the periphery of the hinge shoulder.

6. The mobile phone as claimed in claim 1, wherein the contact means is installed to an inner side surface of a hinge arm extension portion extending from the hinge arm and brought into contact with an outer side surface of a neck portion of the hinge shoulder.

7. The mobile phone as claimed in claim 1, wherein the contact means is installed to an outer side surface of a neck portion of the hinge shoulder and brought into contact with an inner side surface of a hinge arm extension portion extending from the hinge arm.

8. The mobile phone as claimed in claim 1, wherein the contact means includes a contact protrusion made of a viscoelastic material.

9. The mobile phone as claimed in claim 1, wherein the contact means includes a contact protrusion elastically and retractably installed to the housing.

10. The mobile phone as claimed in claim 8, wherein the contact protrusion is flush with the corresponding contact surface in the closed position.

11. A folder type mobile phone, comprising:
    a first housing;
    a second housing, wherein the second housing may be folded and closed on the first housing and is pivotably connected to the first housing via a hinge;
    a rib formed on an outer edge of the first housing and facing an outer side surface of the second housing in a closed position; and
    a contact means installed on the rib to come into contact with the outer side surface in the closed position, wherein the contact means prevents the second housing from moving in a direction with respect to the first housing.

12. The mobile phone as claimed in claim 11, wherein the contact means includes a contact protrusion made of a viscoelastic material.

13. The mobile phone as claimed in claim 11, wherein the contact means includes a contact protrusion elastically and retractably installed to the first housing.

14. The mobile phone as claimed in claim 12, wherein the contact protrusion is flush with the corresponding contact surface in the closed position.

* * * * *